United States Patent Office 2,923,735
Patented Feb. 2, 1960

2,923,735

PROCESS FOR THE MANUFACTURE OF DERIVATIVES OF 4-HYDROXY-ISOPHTHALIC ACID

Hans Erlenmeyer, Basel, Switzerland

No Drawing. Application July 3, 1956
Serial No. 595,608

2 Claims. (Cl. 260—519)

The present invention relates to the manufacture of new compounds having the general formula:

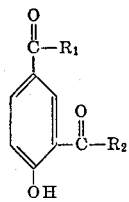
I wherein one of the symbols $R_1$ and $R_2$ represents a hydroxyl group and the other represents an unsubstituted or substituted amino group, and of salts of these compounds.

The compounds of Formula I can be prepared by a process which comprises splitting off one of the ester groups from a diester of 4-hydroxy-isophthalic acid, and reacting the resulting monoester with ammonia or an amine.

Diesters which may be used as starting compounds include lower di-alkyl esters, such as dimethyl or diethyl 4-hydroxy-isophthalate, and di-aralkyl esters, such as benzyl 4-hydroxy-isophthalate.

The step of splitting off one of the ester groups from the diester of 4-hydroxyl-isophthalic acid can be carried out by saponification or by means of a trans-esterification reaction.

The saponification can be carried out according to the usual methods, preferably by means of an aqueous or alcoholic alkali hydroxide solution or by means of PbO in the presence of water, if desired under pressure and/or at elevated temperature.

The trans-esterification of the diester of 4-hydroxy-isophthalic acid can be effected, e.g., by reacting equimolecular amounts of the diester and of the corresponding dicarboxylic acid, for example 1 mole of dimethyl 4-hydroxy-isophthalate and 1 mole of 4-hydroxy-isophthalic acid, in the presence of an ion exchanger, such as Wofatite, and preferably in the presence of a solvent in which both reaction components are soluble, such as dioxane.

The amidation of the resulting monoester with ammonia or an amine can be carried out at atmospheric pressure and at room temperature. Depending on the amine used it may, however, be advantageous to effect the amidation at elevated temperature and/or under elevated pressure. The amidation is preferably carried out by using a substantial excess of ammonia or amine, e.g. an excess of 10–20 times the amount of the monoester used. The amidation is conveniently carried out in aqueous or alcoholic, preferably methanolic solution.

The above described process is particularly suitable for the manufacture of 1-monoamides of 4-hydroxy-isophthalic acid. The resulting monoamides, which may carry substituents on the nitrogen atom, can be converted into salts, such as alkali or alkaline earth metal salts, by the usual methods. The monoesters of 4-hydroxy-isophthalic acid as well as the monoamides thereof obtained according to the present process are new compounds.

Those compounds of Formula I wherein $R_1$ represents a hydroxyl group and $R_2$ represents an unsubstituted or substituted amino group, and salts thereof, can also be prepared by a process which comprises introducing a carboxyl group into the para-position to the hydroxyl group of a compound having the general formula:

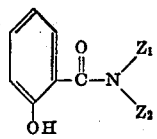
II wherein $Z_1$ and $Z_2$ represent hydrogen, lower alkyl or alkenyl, aryl or aralkyl radicals, and, if desired, converting the resulting product into a salt, e.g. an alkali metal salt.

According to the present invention compounds of Formula I wherein $R_1$ represents a hydroxyl group and $R_2$ represents an unsubstituted or substituted amino group can also be prepared by a process which comprises reacting 4-hydroxy-isophthalic acid with a heavy metal salt, preferably of a weak acid, in the ratio of 1 mole of 4-hydroxy-isophthalic acid to $$\frac{1}{n}$$

mole of heavy metal salt where $n$ represents the valence of the metal, subjecting the resulting 3-mono heavy metal salt of 4-hydroxy-isophthalic acid to the action of an alkyl halide, reacting the resulting 3-mono-alkyl ester of 4-hydroxy-isophthalic acid with a compound having the general formula:

III wherein $Z_1$ and $Z_2$ have the meaning as defined above, and, if desired, converting the obtained product into a salt.

The monoamides of 4-hydroxy-isophthalic acid obtained by these processes can be converted into salts, e.g. alkali metal salts, in a manner known per se.

The alkali metal salts can be obtained, e.g., by dissolving the monoamides in aqueous alkali hydroxide solutions, and isolating the formed salts by concentrating the aqueous solutions, if desired, under reduced pressure. The monoamides can also be reacted with alkali hydroxides in alcoholic solution. The resulting salts will generally precipitate from the alcoholic solution in crystalline form.

The radicals referred to as $Z_1$ and $Z_2$ in Formula II may be, e.g., lower alkyl radicals such as methyl, ethyl, n-propyl, isopropyl, n-butyl, sec.-butyl, tert.-butyl, etc.; lower alkenyl radicals such as allyl, propenyl, etc.; unsubstituted or substituted aryl radicals such as phenyl, p-chlorophenyl, etc.; or aralkyl radicals such as benzyl, etc.

As starting compounds corresponding to Formula II there may be used, e.g., 2-hydroxy-N-monomethyl-benzamide, 2 - hydroxy - N,N - dimethyl-benzamide, 2-hydroxy - N - monoethyl-benzamide, 2-hydroxy-N-benzyl-benzamide, 2-hydroxy-N-allyl-benzamide, 2-hydroxy-N-p-phenyl-benzamide, etc.

As compounds corresponding to Formula III there may be used, e.g., ammonia, monomethyl amine, diethyl amine, allyl amine, benzyl amine, etc.

The 3-mono-amide of 4-hydroxy-isophthalic acid can be obtained, e.g., by subjecting 2-hydroxy-benzamide (salicyl amide) to a Kolbe reaction, e.g., by heating a mixture of solid salicyl amide and solid potassium carbonate, or the potassium salt of salicyl amide for several hours at about 200° C. and at elevated pressure, e.g. at 20 atmospheres gauge pressure, in a carbon dioxide atmosphere. This reaction yields 3-cyano-4-hydroxybenzoic acid which can be hydrolysed to the 3-monoamide, e.g. by means of concentrated sulphuric acid at low temperature.

It is also possible to prepare the 3-mono-amide of 4-hydroxy-isophthalic acid in a single step by carrying out the Kolbe reaction under modified conditions. The salicyl amide is dissolved in an alcoholic, e.g. methanolic, solution of potassium hydroxide in an amount stoichiometrically equivalent to the amount of salicyl amide, whereupon kieselguhr and sea sand are added to the solution, and the mixture is evaporated to dryness. A stream of carbon dioxide is then passed over the dry solid mass at elevated temperature, e.g. at 200–210° C., for several hours. The 3-mono-amide of 4-hydroxy-isophthalic acid can be obtained directly from the resulting reaction mass by convenient separation and purification.

A further mode of preparing 4-hydroxy-isophthalic acid-3-mono-amide consists in starting from 4-hydroxy-isophathalic acid and reacting this compound with a heavy metal salt, preferably of a weak acid, e.g. a silver, lead or copper salt, preferably with silver acetate, to obtain a 3-mono heavy metal salt of 4-hydroxy-isophthalic acid. This reaction is conveniently effected in an aqueous medium at elevated temperature. The resulting mono heavy metal salt of 4-hydroxy-isophthalic acid is then reacted with an alkyl halide, such as methyl iodide, ethyl bromide, etc., to obtain a 3-mono-alkyl ester of 4-hydroxy-isophathalic acid, e.g. the 3-mono-methyl or 3-mono-ethyl ester, which is subsequently subjected to amidation. The amidation can be carried out by means of ammonia or an amine at atmospheric pressure and at room temperature or at elevated temperature and/or elevated pressure. The amidation is preferably carried out by using a substantial excess of ammonia or amine, e.g. 20 to 50 times the amount of the ester. The amidation is conveniently effected in aqueous or alcoholic solution.

Those compounds of Formula I in which $R_1$ represents an unsubstituted or substituted amino group and $R_2$ represents a hydroxyl group, i.e. the 1-monoamides of 4-hydroxy-isophthalic acid, and salts thereof, can also be prepared by another process which comprises subjecting a compound having the general formula:

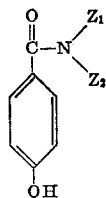

IV wherein $Z_1$ and $Z_2$ represent hydrogen, lower alkyl or alkenyl, aryl or aralkyl radicals, in the presence of a basic alkali metal compound, or an alkali metal salt of a compound of Formula IV to the action of carbon dioxide at elevated temperature and at elevated pressure.

In the above Formula IV, $Z_1$ and $Z_2$ may represent lower alkyl radicals, such as methyl, ethyl, n-propyl, isopropyl, etc.; lower alkenyl radicals, such as allyl, propenyl, etc.; aryl radicals with or without nuclear substituents, such as phenyl, tolyl, p-chlorophenyl, etc.; or aralkyl radicals, such as benzyl, phenylethyl, etc.

The starting materials required for this process can be prepared, e.g., by reacting an ester of p-hydroxybenzoic acid, preferably methyl p-hydroxy-benzoate, with ammonia or a corresponding primary or secondary amine, such as monomethyl or dimethyl amine, monoethyl or diethyl amine, etc.

According to a mode of execution of the process of the invention the starting amide of Formula IV is heated in the presence of a basic alkali metal compound and in the presence of an inert loosening agent under pressure, e.g. in an autoclave, in a carbon dioxide atmosphere. An alkali carbonate or bicarbonate, such as sodium carbonate, sodium bicarbonate, potassium carbonate or potassium bicarbonate, may be used as basic alkali metal compound.

The expression "loosening agent" means a material which increases the surface of the reaction mixture and, therefore, facilitates contacting the reaction mixture with the carbon dioxide without participating in the reaction. Suitable loosening agents are, e.g., Raschig rings, glass fragments, clay fragments, etc.

If p-hydroxy-benzamide is used as starting material, it is convenient to heat a solid mixture of this compound with potassium carbonate or sodium carbonate and Raschig rings for about 2½ hours at about 190° C. in a carbon dioxide atmosphere at a gauge pressure of about 50 atmospheres in an autoclave. The reaction product can be worked up by extraction with a mixture of water and ether and acidification of the aqueous portion with hydrochloric acid. There is thus obtained a precipitate of crude 1-monoamide of 4-hydroxy-isophthalic acid which can be recrystallised, e.g. from water.

Instead of reacting compounds of Formula IV with carbon dioxide in the presence of a basic alkali metal compound, it is also possible to react the alkali metal salts of the compounds of Formula IV with $CO_2$. These alkali metal salts can be obtained, e.g. by dissolving a compound of Formula IV in an alcoholic alkali hydroxide solution, e.g. in an ethanolic potassium or sodium hydroxide solution, and concentrating the resulting solution to dryness. After addition of an inert loosening agent, such as Raschig rings, the solid residue can then be reacted with $CO_2$ at elevated temperature and elevated pressure.

The 1-monoamides of 4-hydroxy-isophthalic acid obtainable according to the present invention are mostly sparingly soluble in water and in the usual organic solvents. By converting them into metal salts, in particular alkali metal salts, they can, however, be brought into a water-soluble form. They can also be converted into alkaline earth and aluminum salts in a manner known per se. The alkali metal salts can be obtained, e.g. by dissolving the 1-monoamides in aqueous sodium or potassium bicarbonate solution and concentrating the aqueous solution, preferably at reduced pressure.

The products obtained according to the present invention are new compounds which possess interesting pharmacological properties. In particular the new monoamides, which are intended to be used for therapeutic purposes preferably in the form of their sodium salts, have a marked salicyclic acid amide-like, analgesic activity. They show a good tolerance in the human organism and have an extremely low toxicity. A further advantage of these compounds results from the fact that they cause less undesirable secondary effects than the usual salicylic acid preparations.

The present invention will now be illustrated by the following examples without being limited thereto.

EXAMPLE 1

2 parts by weight of dimethyl 4-hydroxy-isophthalate are refluxed for 50 hours in 22.2 parts by weight of a 0.421 N methanolic KOH solution with the addition of a small amount of water. The reaction solution is concentrated to dryness in vacuo at 20° C., the residue is taken up in 25 parts by weight of water and acidified with 5% HCl. The resulting precipitate is filtered off and treated with 5% $NaHCO_3$ solution. Any undissolved substance is removed by filtration, and the filtrate is acidified with 5% hydrochloric acid solution. The precipitate which forms is filtered off by suction, dried and taken up in hot benzene. The unreacted, insoluble 4-hydroxy-isophthalic acid is removed by filtration and the filtrate is concentrated. There is thus obtained 1 part by weight of 1-monomethyl ester of 4-hydroxy-isophthalic acid having the following structural formula:

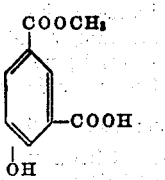

In the purified state this compound melts at 190–192° C.

EXAMPLE 2

2 parts by weight of dimethyl 4-hydroxy-isophthalate, 2.12 parts by weight of PbO and 5 parts by weight of water are heated in a tube for 2½ hours at 120–135° C., while shaking, thus causing the formation of three solid layers. The two lower layers consisting of reddish-yellow PbO and a gray hard mass are comminuted and suspended in a methanol-water mixture (mixing ratio 2:1). $H_2S$ is passed into the suspension for half an hour whereupon the mixture is filtered. The filtrate is concentrated to dryness at 80° C. in vacuo, and the residue is treated with 5% $NaHCO_3$ solution. Undissolved dimethyl ester (0.59 part) is removed by filtration, and the filtrate is acidified with 2 N HCl. There is thus obtained 0.5 part by weight of 1-monomethyl ester of 4-hydroxy-isophthalic acid which, after purification, melts at 189–190° C.

EXAMPLE 3

0.1 part by weight of 1-monomethyl ester of 4-hydroxy-isophthalic acid obtained according to Example 1 or 2 is shaken with 6 parts by weight of 25% aqueous $NH_3$ for 3 days. The solution is acidified to Congo by means of strong HCl (1:1) thus causing precipitation of a gel-like precipitate. For purification, the thus obtained precipitate is dissolved in aqueous $NaHCO_3$ and re-precipitated with strong HCl. There is thus obtained 4-hydroxy-isophthalic acid-1-monoamide which, after sublimation, melts at 292–296° C.

The dimethyl 4-hydroxy-isophthalate used in Examples 1 and 2 can, evidently, be replaced by any other diester of 4-hydroxy-isophthalic acid to obtain the corresponding monoesters and monoamides, respectively.

EXAMPLE 4

3-monomethyl ester of 4-hydroxy-isophthalic acid 1 part by weight of 4-hydroxy-isophthalic acid, 0.92 part by weight of silver acetate and 20 parts by volume of water are heated together for 15 minutes at 90° C. while stirring. The resulting precipitate is filtered off by suction and repeatedly extracted with dioxane to remove unreacted 4-hydroxy-isophthalic acid.

1.2 parts by weight of the solid residue are powdered to a very fine particle size, and 18.2 parts by weight of methyl iodide are added to the powder. The mixture is shaken in a sealed bottle for 2 hours. The reaction mixture is taken up in 100 parts by volume of ether, the silver iodide which forms is filtered off, and the ethereal filtrate is concentrated to dryness. The thus obtained mixture of dimethyl 4-hydroxy-isophthalate and 3-monomethyl 4-hydroxy-isophthalate is shaken with 100 parts by volume of a 5% $NaHCO_3$ solution. the dimethyl ester (M.P. 94–95° C.) remaining undissolved. After filtering off the solid component the filtrate is acidified with concentrated hydrochloric acid to cause precipitation of the 3-monomethyl ester of 4-hydroxy-isophthalic acid. Recrystallisation of the product from dioxane-water yields needles of M.P. 258–260° C.

4-hydroxy-isophthalic acid-3-monoamide

The obtained 3-monomethyl ester is allowed to stand for 20 hours with about 50 times its quantity of 34% ammonia in a sealed bottle. The solution is then concentrated to dryness in vacuo, the colourless residue is dissolved in a small amount of water, the solution is acidified with 2 N HCl, and the precipitated 2-hydroxy-isophthalic acid-3-monoamide is filtered off. After recrystallisation from a large quantity of water the product melts at 287–289° C.

EXAMPLE 5

3-cyano-4-hydroxy-benzoic acid 10 parts by weight of salicyl amide and 100 parts by weight of potassium carbonate dried at 400° C. are heated in an autoclave for 15 hours at 200° C. with carbon dioxide at a pressure of 20 atmospheres.

After cooling, the contents of the autoclave is taken up in 200 parts by volume of water and 50 parts by volume of ether. The aqueous portion of the resulting mixture is separated, again shaken with ether and finally filtered through animal charcoal. On acidifying the filtrate with a mixture of concentrated hydrochloric acid and water (mixing ratio 1:1) there is obtained a precipitate which can be purified by dissolving it in 5% aqueous sodium hydrogen carbonate, boiling the solution with animal charcoal, filtering and precipitating with a mixture of concentrated hydrochloric acid and water (mixing ratio 1:1). By repeated recrystallisation from water there is obtained 3-cyano-4-hydroxy-benzoic acid of M.P. 265–266° C.

4-hydroxy-isophthalic acid-3-monoamide 2 parts by weight of 3-cyano-4-hydroxy-benzoic acid are gradually introduced within half an hour, while mechanically stirring and cooling with a mixture of ice and sodium chloride, into 10 parts by volume of concentrated sulphuric acid. After completion of the addition the mixture is cooled with ice for a further 2 hours, then allowed to stand at room temperature for 40 hours and subsequently poured onto ice. The resulting white precipitate is recrystallised from a large quantity of water. The resulting 4-hydroxy-isophthalic acid-3-monoamide melts at 291–293° C.

EXAMPLE 6

20 parts by weight of salicyl amide are dissolved in a methanolic solution of potassium hydroxide in an amount stoichiometrically equivalent to the amount of salicyl amide. 20 parts by weight of kieselguhr and 20 parts by weight of sea sand are added to the resulting solution, whereupon the mixture is concentrated to dryness on a water-bath under reduced pressure. The residue is completely dried at 200° C. in vacuo. A rapid stream of carbon dioxide is passed over the resulting dry mass for 6 hours at 200–210° C. After cooling, the reaction mixture is taken up in 120 parts by volume of water. After filtering off the kieselguhr, the red-coloured filtrate is acidified with concentrated hydrochloric acid to cause separation of a dark coloured oil. The latter solidifies on standing. 2.4 parts by weight of a product melting at 260–271° C. are obtained.

This product is shaken with 100 parts by volume of aqueous sodium bicarbonate. After filtering off a small amount of undissolved material, concentrated hydrochloric acid is aded to the filtrate. A brown solid precipitates which, after sublimation to star-like crystal groups, melts at 278° C.

The brown-coloured crude product is purified by dissolution in sodium bicarbonate solution and precipitation with concentrated hydrochloric acid and subsequent recrystallisation from water and glacial acetic acid. In admixture with a sample of 4-hydroxy-isophthalic acid-3-monoamide prepared according to Example 4 or 5, the resulting product does not cause any depression of the melting point.

EXAMPLE 7

10 parts by weight of p-hydroxy-benzamide are heated together with 100 parts by weight of potassium carbonate and about 250 parts by weight of Raschig rings for 2½ hours at 190° C. under a $CO_2$-pressure of 50 atmospheres (gauge) in an autoclave. The reaction mixture is then cooled and extracted with 200 parts by volume of water and 50 parts by volume of ether. The aqueous layer is separated and filtered over animal charcoal. The filtrate is acidified with hydrochloric acid (concentrated hydrochloric acid and water in a ratio of 1:1). The precipitate which separates is subjected to fractional crystallisation from water. Pure 4-hydroxy-isophthalic acid-1-monoamide melting at 288–290° C. is thus obtained.

4-hydroxy isophthalic acid-1-monoamide can be converted into its sodium salt by dissolution in aqueous sodium bicarbonate solution and evaporation of the resulting solution under reduced pressure.

What I claim is:
1. 4-hydroxy-isophthalic acid-1-monoamide.
2. Process for the production of 4-hydroxy-isophthalic acid-1-monoamide which comprises heating 4-hydroxy-benzamide for about 2½ hours at a temperature of about 190 degrees centigrade in the presence of potassium carbonate and of a loosening agent, under a $CO_2$ pressure of about 50 atmospheres (gauge) and isolating 4-hydroxy-isophthalic acid-1-monoamide from the reaction mixture.

References Cited in the file of this patent

Wohl: Ber. Deut. Chem., vol. 43 (1910), pp. 3474–84.
Borsche et al.: 28 Chem. Abst. (1934), pp. 5445–6.
Mumm et al.: Ber. Deut. Chem., vol. 72 (1939), page 106.
Dharwarkar et al.: 35 Chem. Abst. (1941), page 2130.
Van der Stelt et al.: 44 Chem. Abst. (1950), page 8338.
Kuhn et al.: 48 Chem. Abst. (1954), page 5898.
Surrey: Name Reactions in Organic Chemistry, pp. 107–8 (1954).